(12) United States Patent
Cockerham

(10) Patent No.: US 6,186,429 B1
(45) Date of Patent: Feb. 13, 2001

(54) MAGNETIC BAIL ACTUATION SYSTEM

(75) Inventor: Rayford A. Cockerham, Broken Arrow, OK (US)

(73) Assignee: Brunswick Corporation, Lake Forest, IL (US)

( * ) Notice: Under 35 U.S.C. 154(b), the term of this patent shall be extended for 0 days.

(21) Appl. No.: 09/438,741

(22) Filed: Nov. 11, 1999

(51) Int. Cl.$^7$ .................................................. A01K 89/01
(52) U.S. Cl. ........................................... 242/231; 335/302
(58) Field of Search .................................. 242/231, 232, 242/233; 335/302, 306

(56) References Cited

U.S. PATENT DOCUMENTS

| | | | |
|---|---|---|---|
| 2,875,410 | * 2/1959 | Lamb | 335/302 |
| 3,104,700 | * 9/1963 | Polsky | 335/302 |
| 3,324,521 | * 6/1967 | Humiston | 335/302 |
| 4,676,450 | * 6/1987 | Carpenter et al. | 242/233 |
| 4,792,106 | 12/1988 | Hlava . | |
| 5,204,572 | * 4/1993 | Ferreira | 335/306 |

* cited by examiner

Primary Examiner—Katherine A. Matecki
(74) Attorney, Agent, or Firm—Fellers, Snider, Blankenship, Bailey & Tippens, P.C.

(57) ABSTRACT

A magnetic bail mechanism utilizing opposed, cooperating magnetic means, each having a plurality of magnetic regions which, when in cooperating relationship, contribute torque and provide a tendency for the magnetic means to separate throughout the bail range. The magnetic means interface to provide a maximum separation tendency between the magnetic means at the trip point of the bail and a minimum separation tendency at each of the cast and retrieve positions. The magnetic means provide a torque force urging the bail into the retrieve position when the bail is located between the retrieve position and the trip point and a torque force urging the bail into the cast position when the bail is located between the trip point and the cast position. The magnetic means are prevented from assuming any arrangement whereby facing regions of opposite polarity are substantially axially aligned.

9 Claims, 7 Drawing Sheets

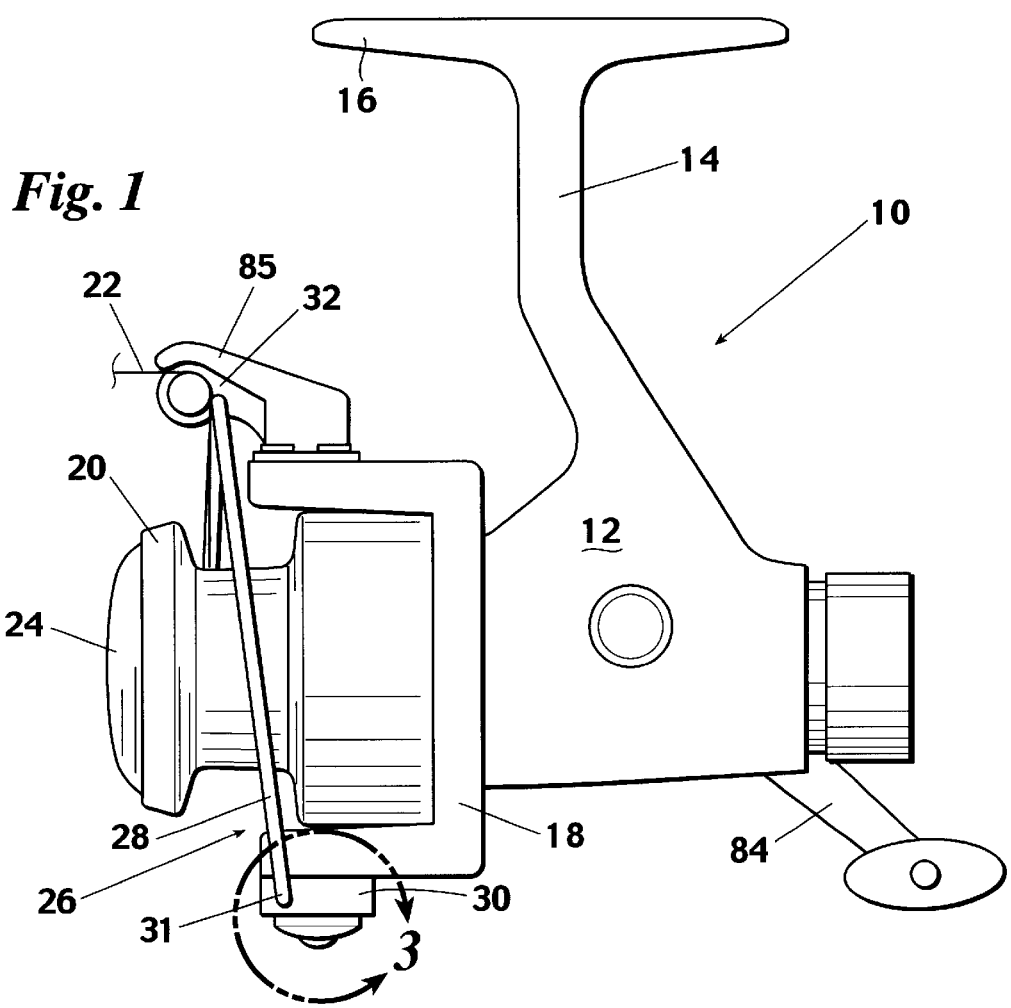
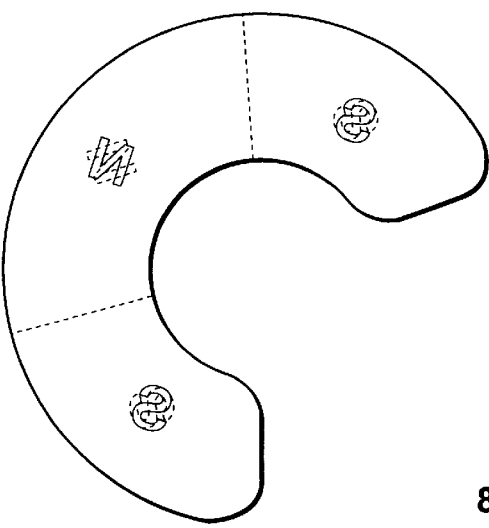
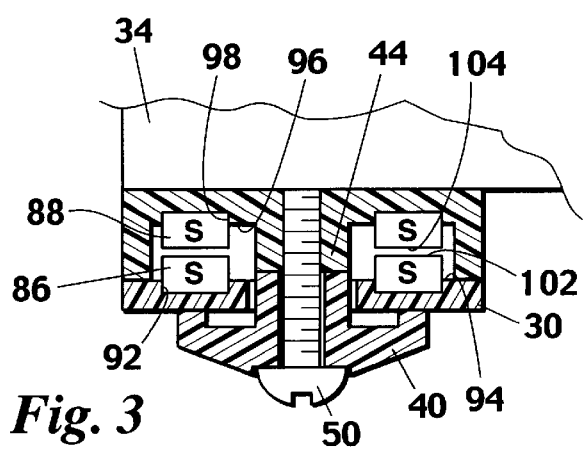

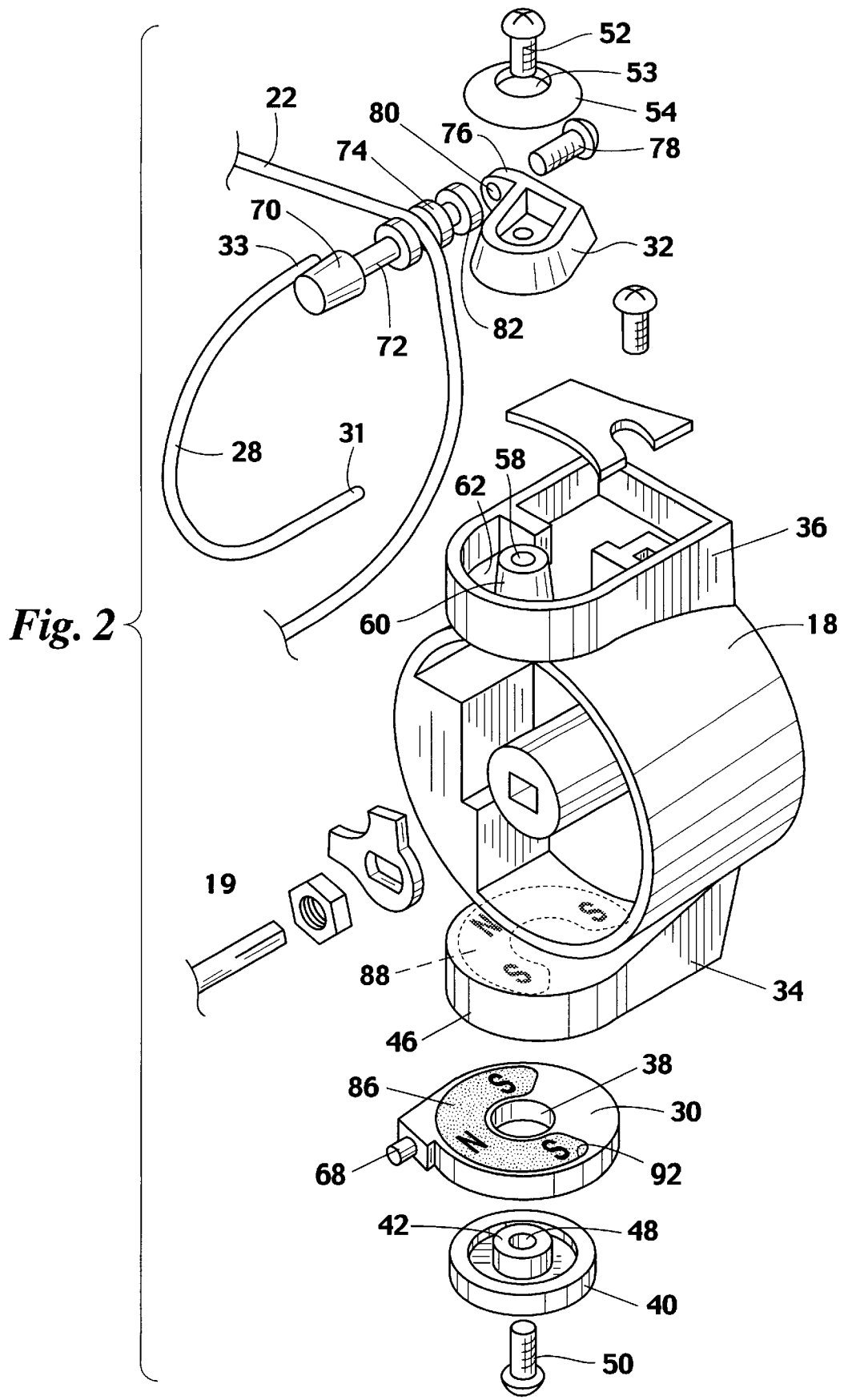

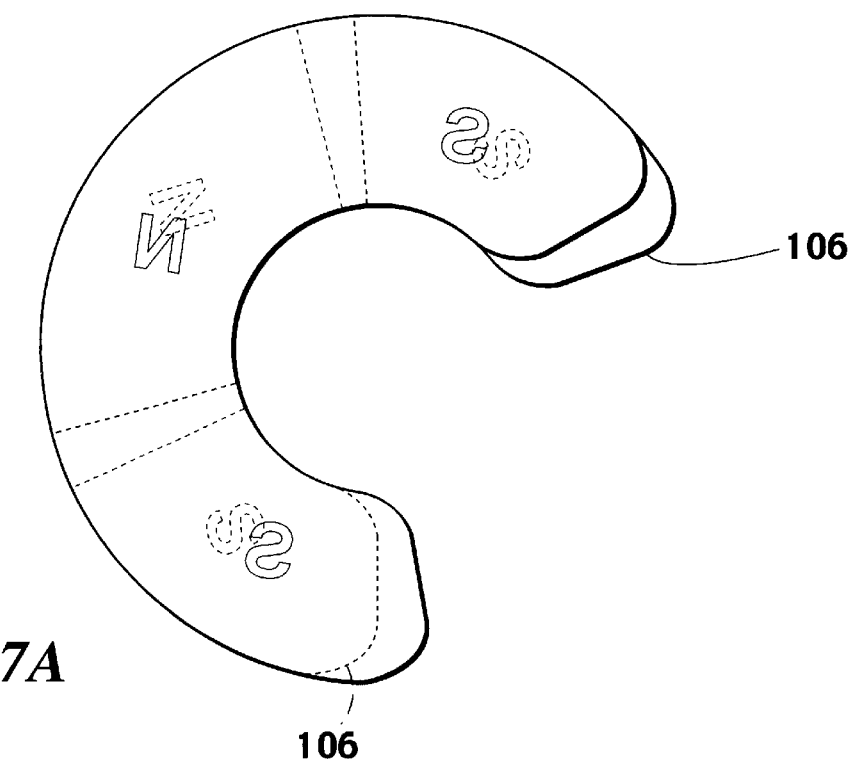
*Fig. 7A*
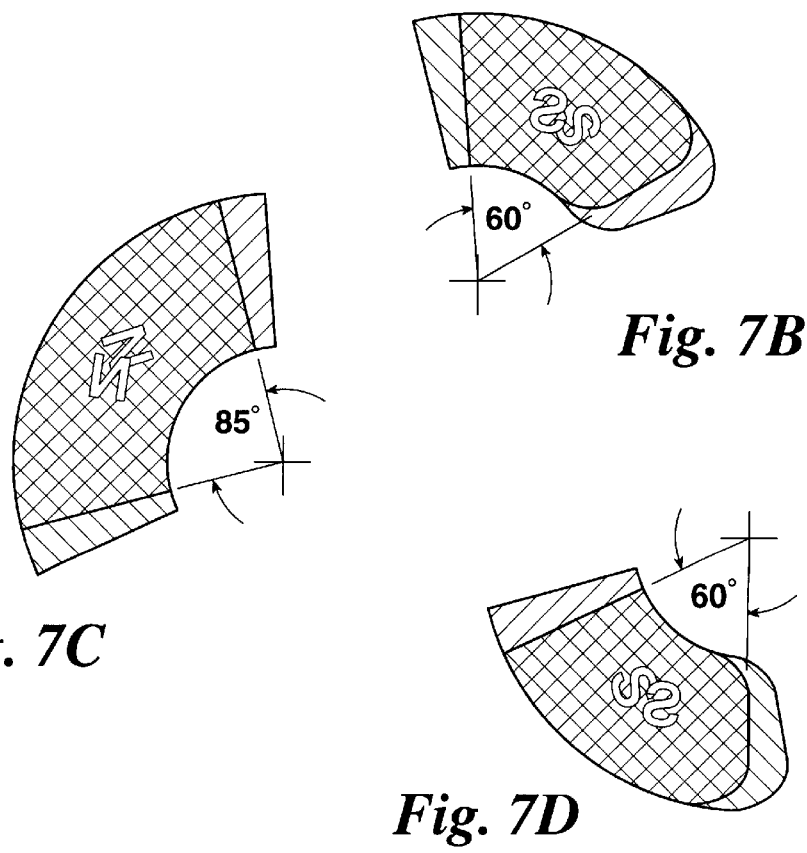
*Fig. 7C*
*Fig. 7B*
*Fig. 7D*

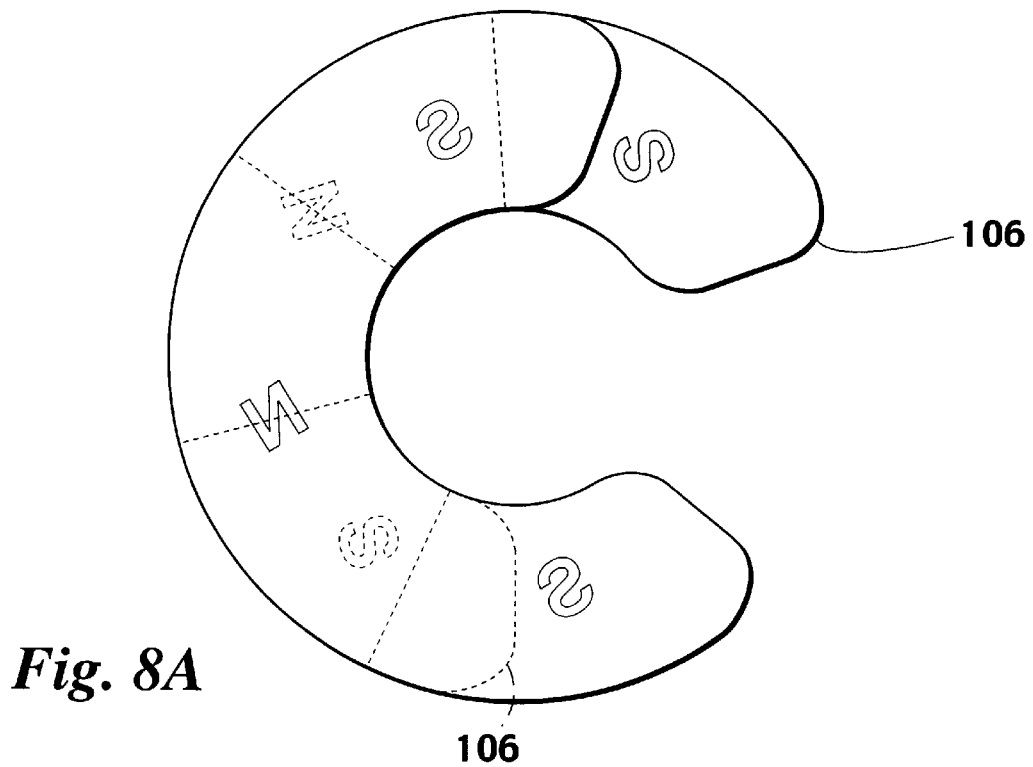
*Fig. 8A*
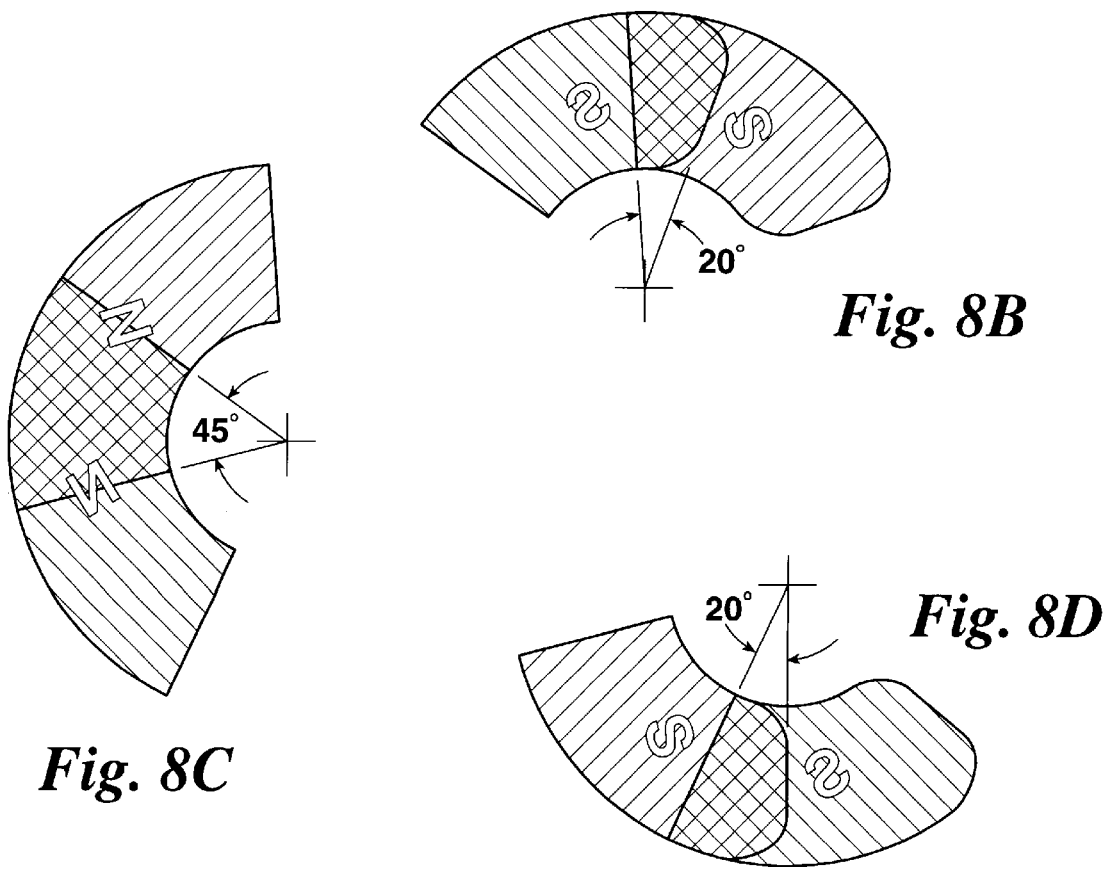
*Fig. 8B*
*Fig. 8C*
*Fig. 8D*

MAGNETIC BAIL ACTUATION SYSTEM

BACKGROUND OF THE INVENTION

1. Field of the Invention

This invention relates to spinning style fishing reels with pivotable bails and, more particularly, to structure for maintaining the bail selectively in each of its "cast" and "retrieve" positions and for providing useful forces throughout the bail range of motion to facilitate movement of the bail between its cast and retrieve positions.

2. Background

A typical spinning style fishing reel has a main casing which carries a rotor housing that is rotatable through the operation of a crank handle. The rotor housing has an associated bail assembly consisting of a U-shaped wire bail with arms at its free ends. The bail arms and bail are rotatable relative to the rotor housing about an axis between a cast position, wherein line can be freely paid out of a line-carrying spool, and a retrieve position, wherein line is drawn by the bail assembly over the spool as the rotor housing is operated. The spool reciprocates in a fore and aft direction concurrently with rotation of the rotor housing and associated bail assembly so that retrieved line is evenly distributed on the spool.

An overcenter spring arrangement is commonly used to drive the bail and bail arms into each of the cast and retrieve positions. Two different spring arrangements impart a rotative force to the bail arm. In one, a coil spring is arranged with its axis parallel to the rotational axis of the bail arm and loaded between the bail arm and rotor housing by twisting the spring about its axis. In the other, the spring is compressed lengthwise between the bail arm and rotor housing and lies transversely to the rotational axis of the rotor arm.

The above conventional structures have the principal drawback that the springs tend to fatigue and frequently break in normal operation, thereby making the bail inoperable. Also, after prolonged use, the springs tend to lose memory, which may result in the spring force being inadequate to positively drive the bail arm into the cast and retrieve positions. Further, the assembly process is complicated by having to install the spring during assembly, which is a fairly delicate operation. Still further, when the reel is disassembled, one faces the possibility of losing the spring or another of the numerous, separable parts associated with the conventional overcenter biasing structure.

U.S. Pat. No. 4,792,106 discloses an improvement in a bail operating mechanism specifically directed to overcoming the above enumerated problems. A first magnet with one particular polarity on one facing surface is provided on either the bail arm or on the rotor housing and second and third magnetic poles of a polarity the same as each other but which polarity is opposite the polarity of the first magnet are provided on the other of the bail arm or rotor housing. The first magnet with one particular polarity and the second and third magnetic poles of opposite polarity are spaced from the rotational axis of the bail arm and are so located that the first magnet of one polarity aligns next to and attracts the second magnetic pole of opposite polarity in the cast position and aligns next to and attracts the third magnetic pole of opposite polarity in the retrieve position. As the bail arm approaches each of the cast and retrieve positions, the second and third magnetic poles are attracted with a progressively increasing force due to the magnetic fields until the maximum attraction occurs with the first magnet with one polarity and the second and third magnetic poles with opposite polarity in proximate, facing relationship, corresponding to the cast and retrieve positions.

One limitation of the prior design is that it may be difficult for conventional bail closing mechanisms operated by the crank handle, typically a kick lever, to overcome the magnetic attraction and drive the bail from its fully open cast position to the point where the bail will trip to its fully closed retrieve position. Most bail closing mechanisms only drive the bail 40–60 degrees to a point at which a spring pushes the bail to its fully closed position. In many instances this may not be far enough to overcome the attractive forces present between substantially axially aligned magnets of opposite polarity.

A further limitation with the prior design is that the magnetic mechanism may tend to bind when the two magnetic poles of opposite polarity are axially aligned in close proximity at the cast and retrieve positions. At these positions the attractive forces between the magnets are greatest. The prior mechanism serves well to hold the bail in the fully open or filly closed position, but does not sufficiently distribute torque forces where most needed to facilitate the tripping of the bail from one position to the other.

It is thus an object of the present invention to provide an improved magnetic bail that maintains the bail selectively in each of its "cast" and "retrieve" positions without undue strength and provides useful forces throughout the bail range to best enable the easy transition of the bail between the cast and retrieve positions.

SUMMARY OF THE INVENTION

The invention comprehends an improvement in a spinning style fishing reel of the type having a line-carrying spool, a rotor housing, a crank handle for rotating the rotor housing about an axis, a bail carried on a bail arm, and means mounting the bail arm for movement relative to the rotor housing selectively between a cast position, wherein line can be paid out of the spool, and a retrieve position, wherein line can be directed onto the spool as the rotor housing is operated by the crank handle.

The improvement resides in a magnetic bail mechanism that utilizes opposed, cooperating magnetic means, each having a plurality of magnetic regions which, when in cooperating relationship, contribute torque and provide a tendency for the opposed magnetic means to separate throughout the bail range of motion. Axial alignment of magnetic regions of opposite polarity is strictly avoided. The magnetic means interface to provide a maximum separation tendency between the magnetic means at the trip point of the bail and a minimum separation tendency at each of the cast and retrieve positions. The magnetic means further provide a torque force urging the bail into the retrieve position when the bail is located between the retrieve position and the trip point and a torque force urging the bail into the cast position when the bail is located between the trip point and the cast position. Minimal torque forces are provided when the bail is at the trip point, typically around 70 degrees from the retrieve position. Torque forces are maximized where most needed along the travel path of the bail.

In a preferred embodiment, each magnetic means possesses three polar regions and comprises a semicircular magnet having polar regions of the same polarity at the opposite end segments of the semicircle separated by a polar region having a polarity opposite that of the end segments. The magnets are arranged in the bail arm and rotor housing respectively in a manner whereby at the trip point of the bail the interfacing regions of like polarity are juxtaposed to provide a maximum separation tendency and minimum torque force. When the bail is located between the retrieve position and the trip point, and likewise between the trip point and the cast position, there are created, by the arrangement of the magnets within the bail arm and rotor housing, torque producing regions which facilitate the movement of the bail between its static end positions. A relatively high torque production is achieved at the cast position while toward the retrieve position the torque production is maximized at points between the trip position and retrieve position.

In this manner, the present invention provides useful forces throughout the bail range of motion to enable the easy transition of the bail between cast and retrieve positions while preventing binding of the bail mechanism caused by the placing of magnets of opposite polarity in axial alignment at close proximity.

A better understanding of the present invention, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention.

BRIEF DESCRIPTION OF THE DRAWINGS

FIG. 1 is a side elevation view of a spinning style fishing reel with a rotor housing having an associated magnetic bail assembly according to the present invention.

FIG. 2 is an exploded perspective view of the rotor housing and bail assembly of FIG. 1.

FIG. 3 is an enlarged, sectional view of the connection between the bail arm and rotor housing taken along line 3—3 of FIG. 1.

FIG. 6 is a schematic diagram showing the relative position of the two opposed cooperating multi-pole magnets utilized in the preferred embodiment when the bail is located approximately 70 degrees from the fully closed, retrieve position.

FIGS. 7A–D are schematic diagrams showing the relative positions and torque producing regions of the two opposed cooperating multi-pole magnets utilized in the preferred embodiment when the bail is located approximately 60 degrees from the fully closed, retrieve position.

FIGS. 8A–D are schematic diagrams showing the relative positions and torque producing regions of the two opposed cooperating multi-pole magnets utilized in the preferred embodiment when the bail is located approximately 20 degrees from the fully closed, retrieve position.

DETAILED DESCRIPTION OF THE PREFERRED EMBODIMENT

Figure 4A:
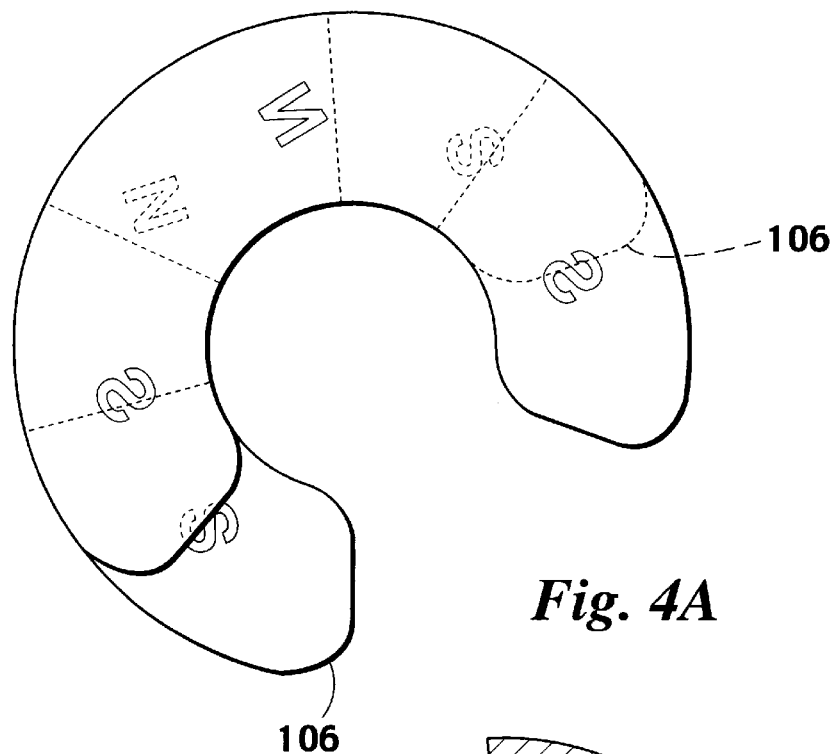
FIGS. 4A–D are schematic diagrams showing the relative positions and torque producing regions of the two opposed cooperating multi-pole magnets utilized in the preferred embodiment of the invention when the bail is in a fully open, cast position.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals designate identical or corresponding parts throughout the several views, and to FIGS. 1 and 2 in particular, a spinning reel exemplary of the environment of the invention is shown generally at 10, having incorporated therein a magnetic bail system according to the present invention, it being understood that various spinning reel bail structures are amenable for use with the present invention. Only that structure necessary to an understanding of the present invention is described below. Details of the remainder of the reel structure are explained fully in U.S. Pat. No. 4,426,045, which patent is incorporated herein by reference.

The spinning reel 10 has a main casing 12 for the main reel operating mechanism, with an integral mounting stem 14 terminating in a foot 16 for connection in conventional manner to a fishing rod (not shown). At the forward portion of the casing 12, a rotor housing 18 is mounted for rotation about a lengthwise axis. A central shaft 19, extending lengthwise of the reel casing 12, has at its forward end a spool 20 upon which a supply of line 22 can be wound. A hub 24 secures the connection of the spool 20 to the shaft 19.

The rotor housing 18 has an associated bail assembly 26 consisting of a wire bail 28, formed generally in the shape of a U, with the ends 31 and 33 connected with arms 30, 32. The arms 30, 32 are pivotally connected to two ears 34, 36, formed integrally with the rotor 18 at diametrically opposite positions thereon.

The arm 30 has a throughbore 38 to facilitate mounting of the arm 30 on the ear 34. A cap 40 has an integral hub 42, which is passed through the bore 38 and into abutting relationship with a lug 44 on a wall 46 of the ear 34. The cap 40 has a throughbore 48. The lug 44 is internally threaded so that with the hub 42 extended through the bore 38 and abutted with the lug 44, a screw 50 can be passed through the bore 48 and into the hub 44 to secure the connection of the arm 30 and rotor housing 18 so that the arm 30 is freely guidingly rotatable relative to the ear 34 about the hub 42.

Arm 32 is connected to ear 36 in a somewhat similar fashion. A screw 52 is directed through an aperture 53 in an end cap 54, the arm 32 and into a threaded bore 58 in a lug 60 integrally formed with a wall 62 on the rotor housing ear 36.

The bail ends 31, 33 are connected respectively to the arms 30, 32 and to the rotor housing ear 34 and ear 36. The bail end 31 is pressed into a bore 68 on the arm 30. The opposite bail end 33 has a bent end seated in a bore in fitting 70 having an associated pivot shaft 72, which has an axially extending, threaded bore. The pivot shaft 72 is directed through an hourglass-shaped line roller 74 and is held against a tab 76 on the arm 32 by a screw 78, which is passed through a bore 80 on the tab 76 and into the bore of shaft 72. A washer 82 is interposed between the tab 76 and the line roller 74. The bail arms 30, 32 are thus mounted for rotation about a common axis extending along the axis of the screws 50, 52 and extending transverse to the axis of the central shaft 19 running lengthwise of the reel 10.

Spinning reels have two well known optional features, one being a bail self-centering feature whereby a partial reverse turn on the crank handle will rotate the rotor and bail to a vertically oriented position which facilitates opening the bail for a cast. The second feature is an internal bail closing mechanism, such as a kick lever, connected between the crank and the bail on the rotor whereby, with the bail in the open or cast position, immediately upon rotating the crank the bail will be pivoted to a point, termed the "trip point," at which the bail is influenced to assume the fully closed, retrieve position. As used herein the "trip point" of the bail should be taken to mean a location slightly fore of the point at which the bail is positioned by the bail closing mechanism, e.g., kick lever (not shown), immediately upon rotating the crank when the bail is in the fully open, casting position.

In FIG. 1, the reel 10 is shown in the retrieve mode. To direct line onto the reel spool 20, a crank handle 84 is operated to rotate the rotor housing 18 and associated bail assembly 26 about the lengthwise axis of the shaft 19. As this occurs, the line 22, which is directed around the line roller 74, is drawn thereby in a circular path. The spool 20 is caused to reciprocate in a fore and aft direction as the rotor housing 18 is operated. This results in the line being evenly distributed over the spool 20 from front to back thereon.

When it is desired to release the line 22 from the spool 20, as during a cast, the bail 28 is grasped by the user and manually reoriented by pivoting the bail about the axis through the screws 50, 52 to the cast position shown generally in FIG. 2. In this position, the line roller 74 is pivoted away from the line so that the line can pay out freely from the spool 20. An optional quick release trigger 85 is shown in FIG. 1 to manipulate the bail 28 from the retrieve to the cast position. However, either a manual system or a quick release system is used in the same manner with the invention. Suitable stops (not shown) are provided to limit rotation of the bail at the extremes of travel i.e. the cast and retrieve positions. An exemplary pivoting range of motion for the bail is on the order of 110–115 degrees. As used herein references to angles or degrees indicating position of the bail refer to the angular deviation of the bail from the fully closed, retrieve position unless otherwise provided.

Once a desired amount of line has been released or cast the crank handle 84 is again operated. This causes the bail 28 to be pivoted from the cast position of FIG. 2 back towards the retrieve position of FIG. 1. The present invention is specifically directed to improvements in magnetic structures for both driving the bail into the cast and retrieve positions through the bail arms 30, 32 and maintaining the bail 28 in each of these positions.

FIGS. 2 and 3 are illustrative of a preferred embodiment of the invention, wherein opposed, cooperating magnetic means, namely magnets 86 and 88, are arranged in the bail arm 30 and rotor housing 18 respectively. Magnet 86 is seated in a countersunk bore 92 on a wall 94 on the arm 30. Magnet 88 is held in place on a wall 96 on the rotor housing ear 34 in countersunk bore 98. The magnets 86, 88 are spaced equidistantly from the rotational axis of the bail arms 30, 32 and the axial dimension of the magnets is chosen so that facing (or interfacing) surfaces 102, 104 on magnets 86, 88 respectively are held in close proximity throughout the bail range of motion. It should be understood that the arrangement described may just as easily be provided on the opposite side of the rotor housing 18 utilizing bail arm 32 and rotor housing ear 36 to house the magnetic means.

The magnetic means, and particularly the preferred magnets 86, 88, are arranged on the bail arm 30 and rotor housing 18, as described more fully below in connection with FIGS. 4–9, in a manner to make advantageous use of the magnetic forces therebetween. When in opposed cooperating relationship the magnetic means interface to provide (1) a maximum separation tendency between the magnetic means at the trip point of the bail and a minimum separation tendency at each of the cast and retrieve positions, (2) a torque force urging the bail into the retrieve position when the bail is located between the retrieve position and the trip point, and (3) a torque force urging the bail into the cast position when the bail is located between the trip point and the cast position. Throughout the bail range of motion, however, there is avoided any substantially fully coaxial relationship between magnetic poles of opposite polarity and the torque produced varies in accordance with the bail position. Minimal torque forces are provided when the bail is at the trip point, typically around 70 degrees from the retrieve position. Maximum torque forces are generated by the preferred arrangement approximately 30–40 degrees either side of the trip point. Thus, on the cast position side, maximum torque forces are provided substantially at the fully open, cast position. On the retrieve position side, the maximum torque forces are provided roughly midway between the retrieve and trip positions.

Referring again to the preferred embodiment illustrated in FIGS. 2–3, magnet 86 is provided with three poles shown facing radially inwardly from the bail arm 30, thus creating three distinct regions of polarity. Similarly, magnet 88 has three poles facing radially outwardly from the rotor housing ear 34, creating like regions of polarity. The indications of polarity shown in FIGS. 2 and 3, and as further explained hereunder, should be taken to refer to the polarity at the interfacing surface of each magnet 86, 88.

In the preferred embodiment, each magnet 86, 88 comprises a semicircular magnet having polar regions of the same polarity at the opposite end segments of the semicircle (shown in the drawings as a south (S) pole) separated by a polar region having a polarity opposite that of the end segments (i.e., a north (N) pole). The most preferred magnets have polar end segments encompassing an angle of approximately 75 degrees and a middle region of opposite polarity of about a 100 degree angle. The magnets are arranged in the bail arm and rotor housing respectively in a manner whereby at the trip point of the bail the regions of like polarity are juxtaposed to provide a maximum separation tendency and minimum torque force. This position is illustrated in FIG. 3 wherein it can be seen that the magnets 86, 88 are in a substantially fully overlapping or mirror-image orientation whereby the regions of polarity at the end segments of the magnets 86, 88 (the S poles) are substantially coaxially aligned. When the bail is located between the retrieve position and the trip point, and likewise between the trip point and the cast position, there are created by the arrangement of the magnets within the bail arm and rotor housing and the interaction between the magnetic fields of the angularly disposed magnetic poles several torque producing regions which facilitate the movement of the bail between its static end positions. When in either the cast or retrieve positions, the magnets 86, 88 exhibit a minimum separation tendency. Yet the magnets 86, 88 do not ever assume a position whereby facing regions of opposite polarity are substantially coaxially aligned.

Upon the user operating the crank handle 24 with the bail assembly 26 in the cast position, the bail closing mechanism causes the bail arm 32 to be pivoted to a location slightly beyond the trip point of the bail assembly 26 whereupon a torque force urges the bail into the retrieve position. Conversely, when the users grasps the bail assembly 26 and rotates its from the retrieve position to the cast position, upon reaching a location slightly beyond the trip point a torque force urges the bail into the cast position. The inventive mechanism operates smoothly and does not bind due to the fact that there is maintained throughout the bail range of motion certain overlapping regions of like polarity providing a separation tendency between the magnetic means.

An exemplar arrangement of magnets to provide the desired separation tendency and torque producing regions are illustrated in FIGS. 4–9 to which attention is now directed. Two of the aforedescribed type of magnets having three poles at their interfacing surfaces are shown in the figures in an opposed, cooperating relationship in various arrangements corresponding to certain bail locations. For ease of explanation, the magnet to be set in the rotor housing ear bears the reference numeral 106 throughout the several views and is referred to hereafter as the "rotor magnet". The opposed magnet to be set in the bail arm is referred to as the "bail magnet".

Figure 4B:
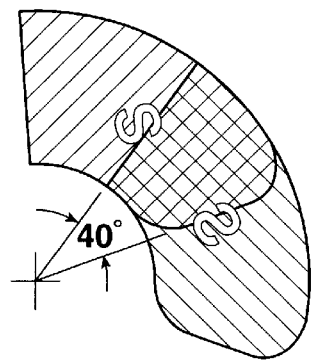
Figure 4C:
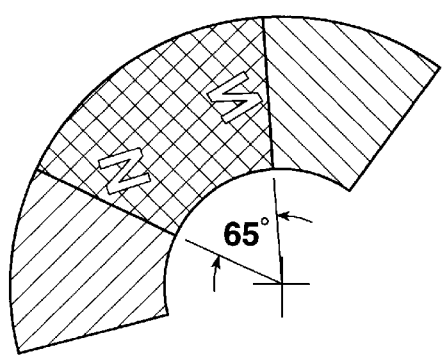
Figure 4D:
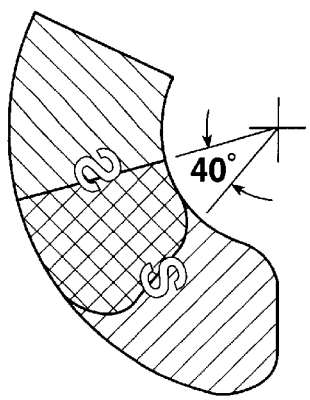
Figure 5A:
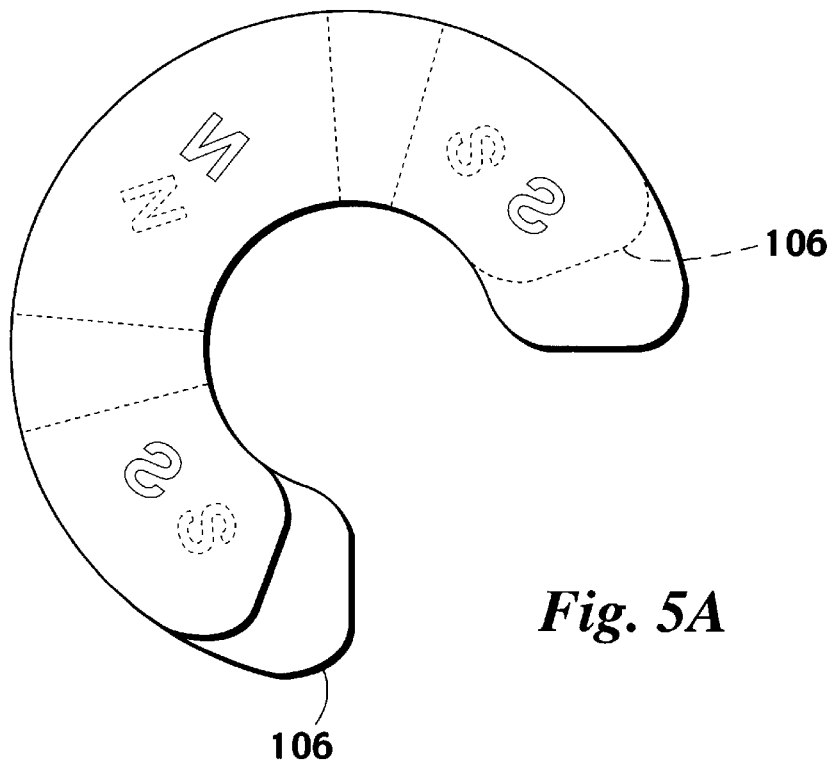
FIGS. 5A–D are schematic diagrams showing the relative positions and torque producing regions of the two opposed cooperating multi-pole magnets utilized in the preferred embodiment when the bail is located approximately 90 degrees from the fully closed, retrieve position.
Figure 5B:
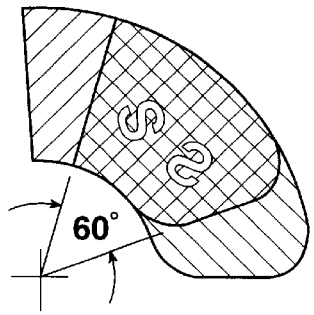
Figure 5C:
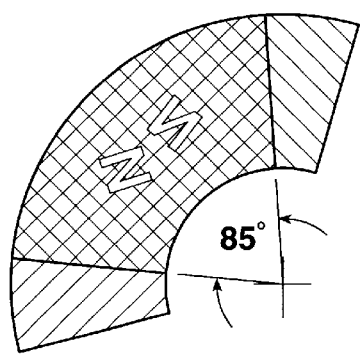
Figure 5D:
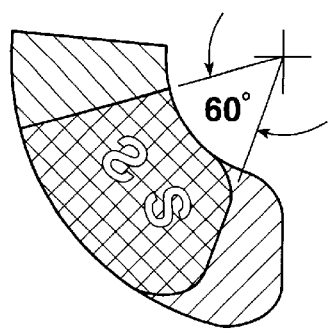
Figure 9A:
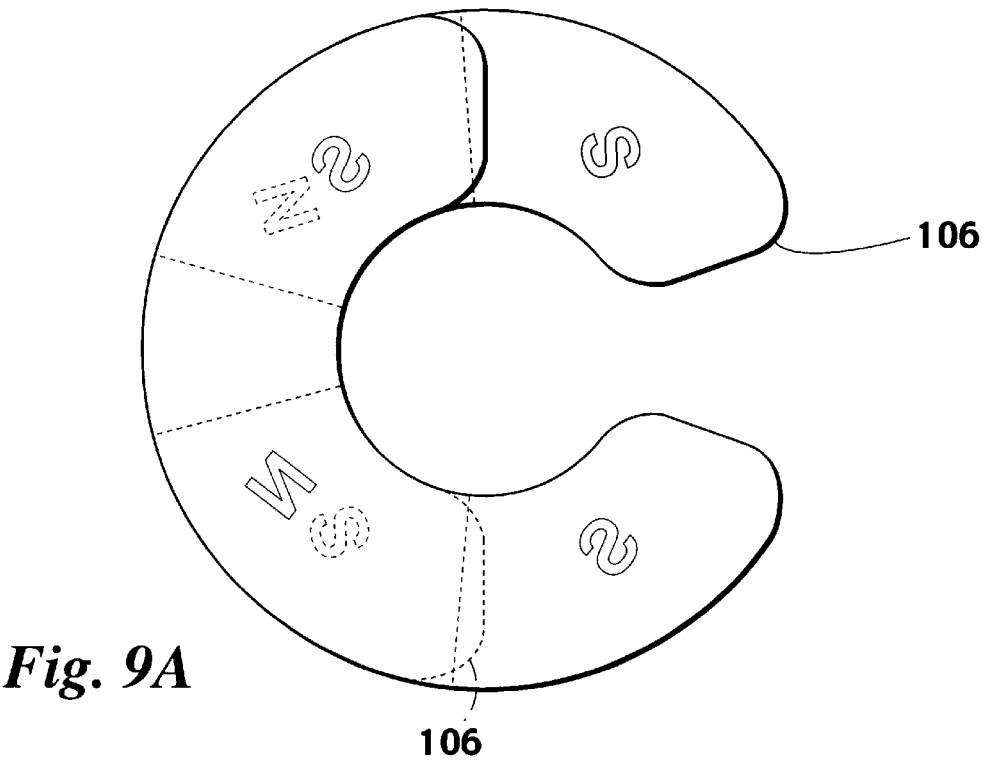
FIGS. 9A–D are schematic diagrams showing the relative positions and torque producing regions of the two opposed cooperating multi-pole magnets utilized in the preferred embodiment when the bail is in a fully closed, retrieve position.
Figure 9B:
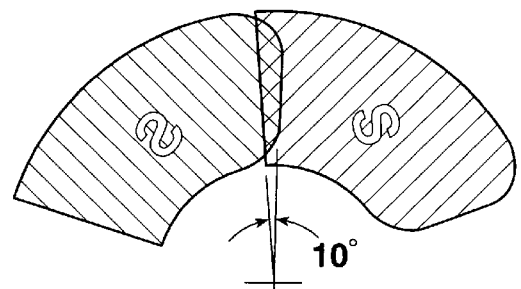
Figure 9C:
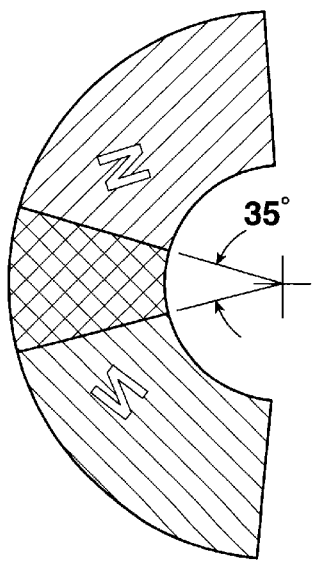
Figure 9D:
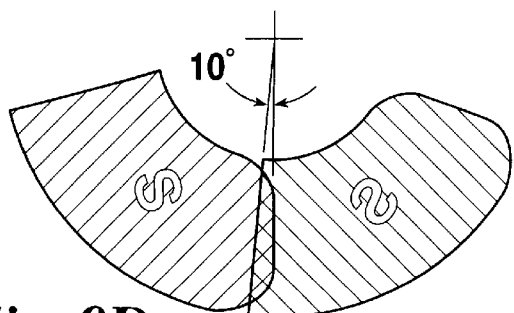

FIGS. 4A–D are schematic diagrams showing the relative positions and torque producing regions of the two opposed cooperating multi-pole magnets when the bail assembly is in a fully open, cast position, typically about 110 degrees from the fully closed, retrieve position. It can be seen that at this position the magnets possess a tendency to separate while the bail arm would tend to be driven in a clockwise direction. FIGS. 4B, 4C, and 4D illustrate diagrammatically the forces at work to achieve the desired effect. Three overlapping regions of like polarity, two approximate 40 degree areas toward the end segments of the magnets and about a 60 degree area between the end segments, serve to produce repulsive forces tending to separate the magnets. The magnet arrangement, however, also produces torque that tends to drive the bail magnet, and thus the bail arm, in a clockwise direction due to the interaction of magnetic forces between the angularly displaced, opposed magnetic poles. As shown in FIGS. 4B–D, the poles on the facing surface of the bail magnet are angularly displaced in a clockwise direction from the like poles of the rotor magnet. Since the rotor magnet is held statically in the rotor housing ear while the bail arm is pivotable, the bail magnet and bail arm are driven by the magnetic forces at work between the poles to move in a clockwise direction. In this fashion, the bail arm is magnetically urged to maintain the cast position.

Continuing on with FIGS. 5A–D, the interrelationship between the magnets when the bail is at an approximate 90 degree position is shown. At this point, it can be seen that there is an increased tendency of the magnets to separate as compared to the cast position arrangement as there is a greater overlap of regions of like polarity between the facing surfaces of the magnets, i.e. two approximate 60 degree areas toward the end segments of the magnets and about a 85 degree area between the end segments. The bail arm tends to be driven clockwise but with a lesser torque than in the fully open, cast position.

FIG. 6 shows the position of the magnets at about a 70 degree bail position which roughly corresponds to a typical trip position. As can be seen, the two magnets are in a mirror image relationship thus having a tendency to provide maximum separation and a minimum of torque. Indeed, at this position there are no definable torque producing regions.

Turning now of FIGS. 7A–D, the arrangement of the magnets is shown when the bail is in an approximate 60 degree position. In this arrangement, the magnets possess a fairly strong tendency to separate as, similar to the 90 degree bail position, there is an overlap of regions of like polarity between the facing surfaces of the magnets consisting of two approximate 60 degree areas toward the end segments of the magnets and about a 85 degree area between the end segments. The bail arm tends to be driven in a counterclockwise direction, however, as the poles on the facing surface of the bail magnet are circumferentially displaced in a counterclockwise direction from the like poles of the rotor magnet.

FIGS. 8A–D show the magnet arrangement when the bail is in an approximate 20 degree position from the fully closed, retrieve state. Here, the magnets maintain a tendency to separate, albeit a somewhat lesser tendency, due to two overlapping 20 degree regions of like polarity toward the end segments of the magnets and about a 45 degree overlapping area of like polarity between the end segments. The bail arm continues to be driven counterclockwise as indicated.

Turning now to FIGS. 9A–D, the magnets are shown as oriented when the bail is in an essentially fully closed, retrieve position. In this situation, the magnets exhibit a minimum tendency to separate. However, the magnets do include overlapping regions of like polarity, i.e., two overlapping 10 degree regions of like polarity toward the end segments of the magnets and about a 35 degree overlapping area of like polarity between the end segments that have been found to be sufficient to achieve the aims of the present invention. There is significant torque production tending to drive the bail arm counterclockwise, although the torque production at this location is less than that provided when the bail is between the retrieve and trip positions as indicated above.

It should thus be evident that as the bail approaches both the cast and retrieve positions, a magnetic force drives the bail into these positions where the bail is securely held until it is either tripped by the bail closing mechanism or moved by the user. Throughout the bail range of motion, though, there is provided a separation tendency created by the overlapping magnetic regions of like polarity and there is prevented by the arrangement of the magnetic means within the bail arm and rotor housing ear any axial alignment of magnetic poles of opposite polarity. In this manner, the objects of the invention are achieved.

It should be noted that it is within the scope of the invention to alter the arrangement of the magnetic means so as to vary to some degree the torque produced at different bail positions so long as the desired separation tendency is maintained throughout the bail range of motion. It is also within the scope of the invention to utilize any manner of acceptable magnets as the claimed magnetic means, including various shaped magnets such as crescent, circular, horseshoe, etc. In addition, it is contemplated that coaxially arranged magnets with radially oriented poles could be utilized as the magnetic means whereupon the aforementioned separation tendency would refer to a radial separation as opposed to an axial separation. It is also contemplated that a piece of magnetically attractive metal might be placed adjacent either the cast or retrieve positions to accentuate the holding forces at these locations. Finally, it is further contemplated to add a metal plate (generally steel) behind magnet 86 or magnet 88 so as to impart greater magnetic forces through the facing sides of the magnets.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. A fishing reel having a line-carrying spool, a rotor housing, a crank handle for rotating the rotor housing about an axis, and a bail carried on a bail arm mounted for movement relative to the rotor housing selectively between a cast position wherein line can be paid out of the spool and a retrieve position wherein line can be directed onto the spool as the rotor housing is operated by the crank handle, the improvement comprising:

opposed cooperating magnetic means on the bail arm and rotor housing respectively for providing a torque force to magnetically urge movement of the bail arm selectively towards each of the cast and retrieve positions and for maintaining the bail arm in each of the cast and retrieve positions while providing a separation tendency throughout the bail range of motion, each magnetic means possessing at least two regions having differing polarities, the magnetic means, when in opposed cooperating relationship, providing a maximum separation tendency between the magnetic means at the trip point of the bail and a minimum separation tendency at each of the cast and retrieve positions.

2. The fishing reel according to claim 1, wherein the magnetic means are arranged in the bail arm and rotor housing respectively such that when the bail is located at approximately 70 degrees from the retrieve position regions of like polarity are juxtaposed to provide a maximum separation tendency and minimum torque force.

3. A fishing reel having a line-carrying spool, a rotor housing, a crank handle for rotating the rotor housing about an axis, and a bail carried on a bail arm mounted for movement relative to the rotor housing selectively between a cast position wherein line can be paid out of the spool and a retrieve position wherein line can be directed onto the spool as the rotor housing is operated by the crank handle, the improvement comprising:

opposed cooperating magnetic means on the bail arm and rotor housing respectively for providing a torque force to magnetically urge movement of the bail arm selectively towards each of the cast and retrieve positions and for maintaining the bail arm in each of the cast and retrieve positions, each magnetic means possessing at least two polar regions having differing polarities, the magnetic means, when in opposed cooperating relationship, providing a separation tendency between the magnetic means throughout the bail range of motion.

4. The fishing reel according to claim 3, wherein the polar regions of each magnetic means are arranged in the bail arm and rotor housing respectively such that when the bail is located at approximately 70 degrees from the retrieve position regions of like polarity are juxtaposed to provide a maximum separation tendency and minimum torque force.

5. The fishing reel according to claim 3, wherein each magnetic means possesses three polar regions facing the opposed magnetic means.

6. The fishing reel according to claim 5, wherein each magnetic means comprises a semicircular magnet having polar regions of the same polarity at the opposite end segments of the semicircle separated by a polar region having a polarity opposite that of the end segments.

7. The fishing reel according to claim 6, wherein the magnets are arranged in the bail arm and rotor housing such that when the bail is located at approximately 70 degrees from the retrieve position regions of like polarity are juxtaposed to provide a maximum separation tendency and minimum torque force.

8. A fishing reel having a line-carrying spool, a rotor housing, a crank handle for rotating the rotor housing about an axis, and a bail carried on a bail arm mounted for movement relative to the rotor housing selectively between a cast position wherein line can be paid out of the spool and a retrieve position wherein line can be directed onto the spool as the rotor housing is operated by the crank handle, the improvement comprising:

opposed cooperating magnetic means on the bail arm and rotor housing respectively for providing a torque force to magnetically urge movement of the bail arm selectively towards each of the cast and retrieve positions and for maintaining the bail arm in each of the cast and retrieve positions while providing a separation tendency throughout the bail range of motion, each magnetic means possessing at least two regions having differing polarities, the magnetic means, when in opposed cooperating relationship, providing (1) a maximum separation tendency between the magnetic means at the trip point of the bail and a minimum separation tendency at each of the cast and retrieve positions, (2) a torque force urging the bail into the retrieve position when the bail is located between the retrieve position and the trip point, and (3) a torque force urging the bail into the cast position when the bail is located between the trip point and the cast position.

9. The fishing reel according to claim 8, wherein the trip point of the bail is approximately 70 degrees from the retrieve position.

* * * * *